United States Patent Office 2,707,027

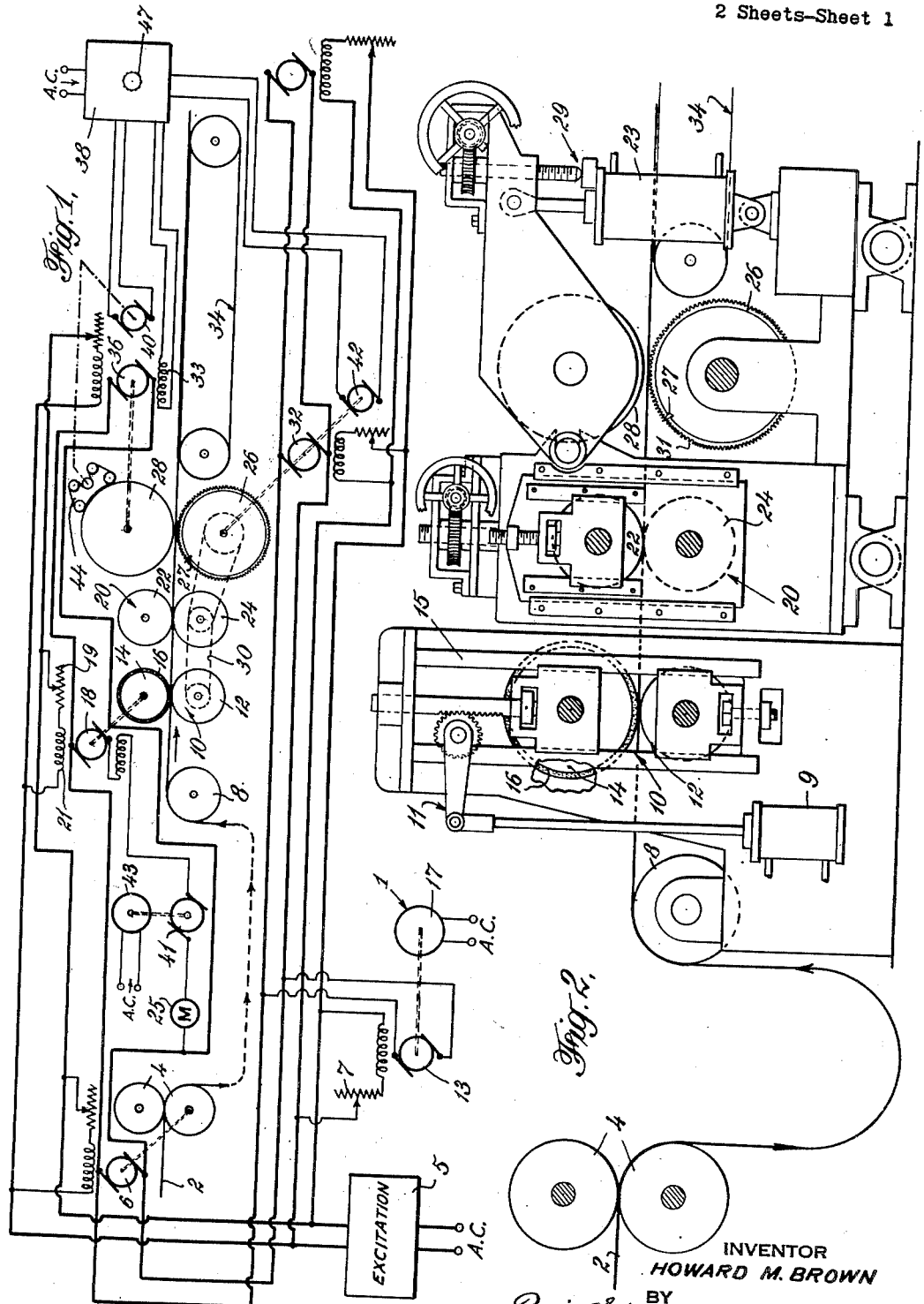

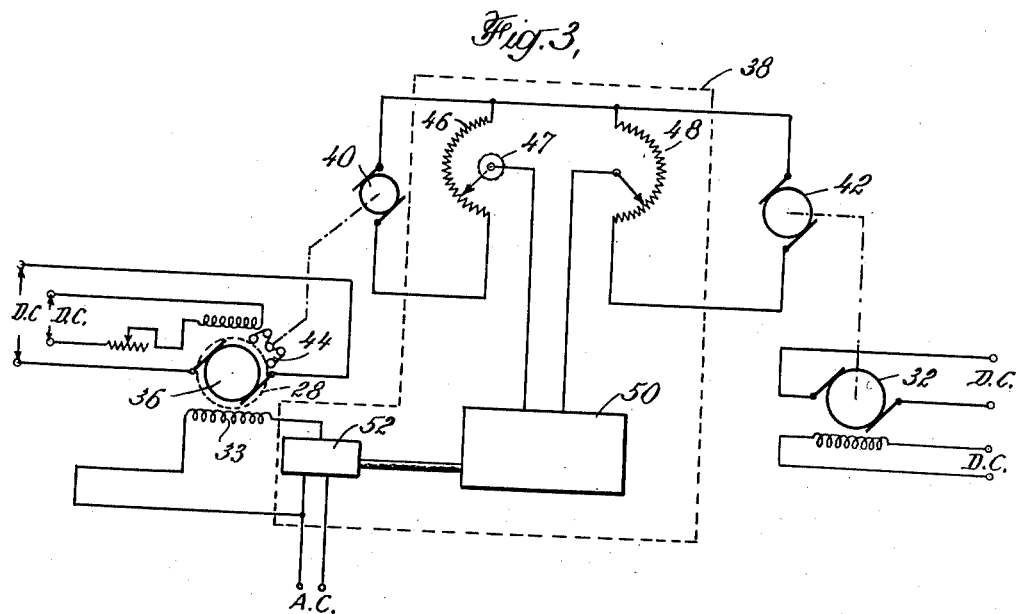
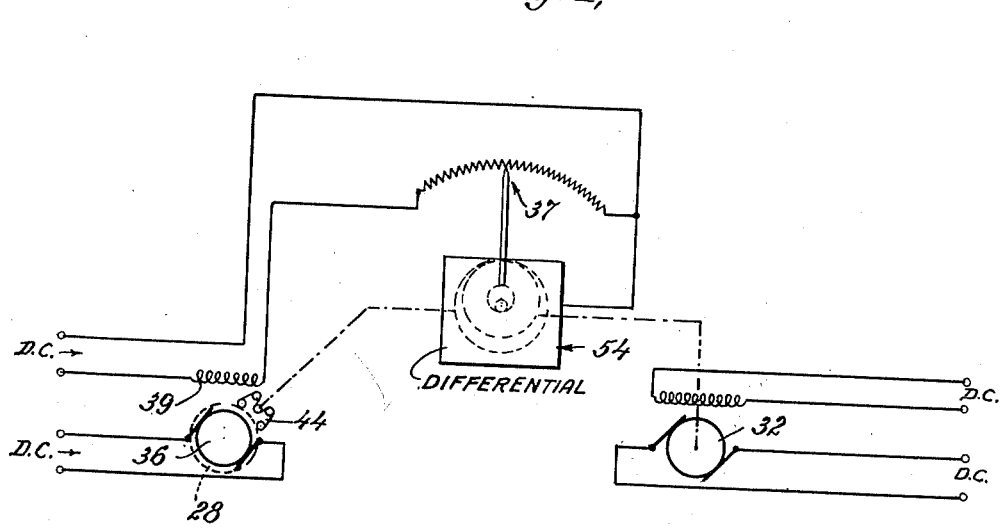

Patented Apr. 26, 1955

2,707,027

MACHINE FOR CUTTING A MOVING STRIP OF SHEET MATERIAL

Howard M. Brown, Wood-Ridge, N. J.

Application October 27, 1950, Serial No. 192,539

6 Claims. (Cl. 164—68)

This invention relates to machinery for the cutting of a continuous web of sheet material into pieces of uniform size and more particularly to the driving mechanism which advances the material past a station at which it is cut. The invention has especial application in the manufacture of roofing material in the form of shingles where the problem of maintaining uniform size of the product is rendered acute by the highly abrasive nature thereof. The invention will be described in terms of its application to a machine for cutting shingles from a continuous web of roofing material although it is to be understood that it may be applied to the cutting of other materials.

A machine for cutting a web of roofing material into shingles requires essentially a pair of draw rolls to advance the material toward a cutting station at a constant rate and a rotating cutter to cut the moving sheet into pieces of uniform size. The cuter typically takes the form of a rotating cylinder having blades affixed to its surface, shaped according to the desired pattern to be cut, and a rotating cylinder or anvil against which the blades come to bear once for each revolution of the cutting cylinder. Uniformity in the size of the shingles depends upon uniformity in the rate of passage of the web through the draw rolls and on constancy in the point of attack between the cutting blades and the web as the web passes between the anvil and the cutting cylinder.

Wear in either or both of the draw rolls, in the anvil and in the cutting blades produces a slow change in the motion of the web through the machine and in the length of the cut shingles which is highly detrimental to the commercial acceptability of the product. For example, in the case of strip shingles three feet long, variations in length of as little as 1/32 of an inch which accumulate in their application to a roof are highly objectionable. Thus the length of the shingles must be controlled to an accuracy of the order of one part in a thousand. This is rendered difficult by the highly abrasive nature of the material, which usually comprises a tar-impregnated felt fabric with a coating of fine crushed rock on one side. The material to be cut is thus highly abrasive on one side and the abrasive qualities of the two sides usually differ markedly. For this reason one of each pair of rolls through which the finished material is passed is subjected to more wear than the other. At the same time the knives which are employed to cut the material are subjected to a large amount of wear which is somewhat irregular.

In the shingle cutting machines of the prior art it has been customary to link together mechanically both rolls of each pair, for example by gears having pitch circles equal to the initial diameters of their respective rolls. With uneven accumulation of wear the surface speeds of the two members of such a pair get out of step and produce uneven motion of the material.

It has further been customary heretofore to drive the cutting cylinder supporting the blades and its mating cylinder or anvil by mechanical means distinct from those employed to drive the draw rolls and to rely upon manual control to keep the rate of rotation of the cutting cylinder and its anvil properly related to the speed of the draw rolls. As an improvement thereon it has been proposed to link together the draw rolls and the cutting cylinder and anvil by some form of variable speed drive. Changes in the relative speeds of the two pairs of rotating members were then to be made by operating on the variable speed drive. I have found however that to hold the length of the shingles to the tolerances now demanded requires such slight changes in the relative speeds of the draw rolls on the one hand and of the cutting cylinder and anvil on the other that mechanical driving mechanism cannot be depended upon to maintain changed speed ratios differing by sufficiently small increments. The wear on the coupling elements which link the draw rolls and the cutting cylinder produces preferred relationships from which sufficiently small departures cannot be made and maintained.

According to the present invention an extremely fine control over the size of the product is obtained by driving from separate sources of mechanical power the two members of each pair of rotating elements which affect the length of the cut product. Electrical control over the motors which separately drive these members permits of extremely fine adjustment of the rate of progress of the web through the machine and past the cutting station.

According to another feature of the invention a basic condition of uniformity is provided for by linking together by means of a fixed ratio drive the cutting cylinder and one of the rolls of the draw pair immediately preceding the cutting station. To a first approximation therefore the progress of the web past the cutting station is made fixed relative to progress past that station of the cutting blades themselves. The effect of wear, wherever occurring, may then be compensated for by variation of the torque input to the independently driven roll of the draw pair and/or by variation of the speed of the anvil relative to that of the cutting cylinder.

According to another feature of the invention means are provided to compare continuously the surface speed of the anvil with the speed of the cutting cylinder in order to compensate for wear on the anvil. Such comparison is preferably accomplished electrically but may also be accomplished by mechanical means whose output may be employed to control the application of power to the anvil.

The invention will now be further described by reference to the accompanying drawings in which:

Fig. 1 is a diagrammatic view of a cutting machine according to the present invention.

Fig. 2 is a view in side elevation of a machine embodying the principles of Fig. 1.

Fig. 3 is a simplified diagram of a form of electrical control for relating the speed of the anvil of the machine of Fig. 1 relative to the speed of the cutting cylinder.

Fig. 4 is a diagrammatic representation of a mechanical system for accomplishing the control function electrically performed by the apparatus of Fig. 3.

In Fig. 1 a web 2 is shown emerging at the left from a forming machine or storage supply through a pair of pull-off rolls 4, not necessarily forming a part of the cutting machine. Between the rolls 4 and the cutting machine the web hangs in a storage loop, from which it passes into the machine over a smoothing roller 8. From the smoothing roller the web passes through a pair of draw rolls 10, thence to a pair of slitting rolls 20 and from the slitting rolls to the cutting station between a cutting cylinder 26 and an anvil 28. After cutting, the shingles are carried away by a take-off assembly 34.

In accordance with the principles of the invention the two rolls of the draw pair 10 are driven from separate sources of mechanical power and the anvil 28 is driven from a source of mechanical power distinct from that which drives the cutting cylinder 26, the cutting cylinder and the lower roll of the pair 10 being linked to a common source of mechanical power. At the same time it is highly desirable to provide adjustable speed for the machine as a whole. Accordingly the machine is preferably operated from D. C. electric power as shown in Fig. 1. The use of D. C. power on the separate driving means supplied to the various elements which advance and cut the web facilitates speed change for the machine as a whole and makes it possible to keep the various drive motors in step throughout such speed changes by operation on a single control.

D. C. power for the machine is supplied from a motor generator set 1. The generator 13 of this set supplies armature voltage to the various drive motors of the machine. Excitation for the generator 13 and for the drive motors is provided from an excitation source 5 which, like the motor 17 of the motor generator set may be fed from commercially available A. C. power. Electronic rectifiers have been found to be convenient for use in source 5 in place of rotating machines. The various drive motors are separately excited from windings connected (apart from certain resistors and protective devices omitted from the figure for simplicity) across the output of the excitation source. Each of these field windings is provided with its own rheostat for individual speed adjustment of its motor. The motors may also have series compensating windings (not shown). Control of the over-all speed of the machine is provided at the field rheostat 7 of the generator 13 through its influence on the output voltage of the generator.

The smoothing roller 8 is rotated slowly backwards by conventional means not shown so as to present the web in a smooth, taut sheet to the draw rolls 10.

The draw rolls 10 comprise a lower roll 12 and an upper roll 14. In view of its linkage to the cutting cylinder subsequently to be described, the lower roll 12 is the fundamental measuring device of the machine. In order to provide it with maximum wearing qualities it is preferably finished in a hard material such as chrome steel with axial flutings around its circumference. The flutings insure continuous tracking between the web and the roll 12, subject to a fine adjustment available through the upper roll 14 as will be further described below.

The upper draw roll 14 is supported in suitable mechanism including means for adjustment of its vertical position, and may be advantageously provided with an elastic covering 16 of rubber or similar material. The upper draw roll 14 is driven by a motor 18 which is preferably compound wound in order to permit accurate regulation of its speed upon starting up of the machine from a stop. A field rheostat 19 in series with the separate field 21 provides manual control of the field on motor 18 and hence of the torque input to the roll 14, independently of changes in the speed of the machine as a whole. Indication of the performance of the motor 18 may be had by means of a current meter 25 in the armature circuit, the meter being preferably of the center scale null type, capable of indicating current flow in either direction. Thus the motor 18 may be used either as a source of power for the machine or as a brake, depending on the modification, if any, which it may be desired to make thereby to the progress of the web through the machine. To insure that the motor 18 will at all times operate under control, a booster generator 41 driven by a constant speed A. C. motor 43 may advantageously be connected in series with the armature of the motor 18.

The web is typically manufactured in a width larger than that desired for the final product and a pair of slitting rolls 20 may be provided, following the draw rolls, for the purpose of cutting the web into narrower widths as desired. The slitting rolls include an upper roll 22 against which the actual slitting knives (not shown) of the lower roll 24 came to bear. Both rolls of the slitting pair are driven together at the same speed which is preferably above the linear speed of the sheet. Since they are without effect on the motion of the web through the machine, they may without disadvantage be linked mechanically together.

The sheet advanced by the draw rolls 10 is cut transversely of its length by the cutting cylinder 26 in cooperation with a backing roll or anvil 28. The cutting cylinder has one or more blades 27 affixed to its periphery, shaped according to the form desired for the finished shingles. Thus the blades may extend parallel to the axis of the cylinder 26, or they may include peripheral deviations for the cutting of notches, etc., in the shingles. Each blade thus comes to bear against the anvil 28 once for each revolution of the cylinder 26. The surface of the cylinder 26 between the blades may be set with rubber fingers 31 (Fig. 2) of approximately the same height as the blades so as to provide a continuous carrying surface for the web. The anvil, which is a hard finished roll, is supported above the cutting cylinder by mechanism which may be similar to that employed for the support of the upper draw roll 14.

As indicated by the dotted line 30 the cutting cylinder 26 and the lower draw roll 12 are mechanically linked to each other and driven from a single source of mechanical power comprising the motor 32. By its operation of the lower draw roll 12 the motor 32 provides a part, at least, of the energy required to draw the sheet through the machine as well as the energy required to drive the cutting cylinder. The slitting rolls may also be linked to the same source of power. The linkage diagrammatically indicated by the dotted line 30 may take the form of gears or a chain and sprocket drive dimensioned to provide the same peripheral speed to the lower draw roll 12 and to the effective circumference of the cutting cylinder at which are located the cutting blades.

This linkage of the draw rolls and cutting cylinder insures that for every inch of peripheral motion of the knives the web to be cut will be advanced by an equal distance, except for a fine control available for correction purposes at the draw rolls by virtue of the separate drive motor 18. Precisely however the fact that the cutting blades must pass through the sheet and the fact they are subject to severe wear from the abrasive material being cut renders the effective diameter of the cutting cylinder somewhat indeterminate. Manual control of the torque input to the upper draw roll 14 at the field control 19, and automatic and manual control of the speed of the anvil cylinder 28 are therefore provided to permit compensation for the wear of the knife blades and of the anvil.

The anvil is driven by a drive motor 36 energized like the others from the motor generator set 1 and the excitation source 5. It includes however, in the embodiment of Fig. 1, an additional field winding 33 for regulation purposes. The winding 33 is excited by the output of a regulating device 38 which compares the surface speed of the anvil with the angular speed of the cutting cylinder 26. For this purpose a surface speed pickup unit 44 is applied to the surface of the anvil. In the embodiment of Figs. 1 and 2 the unit 44 drives a tachometer generator 40 in accordance with the surface speed of the anvil, regardless of the changes in its diameter due to wear. A similar tachometer generator 42 is linked to the cutting cylinder via the motor 32, and its output is fed to the regulating device 38 for comparison with that of the generator 40. The tachometer generator 42 is most conveniently linked to the angular rather than to the surface speed of the cylinder 26 in view of the difficulty of measuring the instantaneous diameter of a rotating knife or knives. The tachometer generators conveniently take the form of permanent magnet-excited D. C. generators whose output voltage is an accurately known function of their speeds.

The regulating device 38 includes means to generate from commercial A. C. electric power an excitation voltage for application to the regulating winding 33. The magnitude of this voltage is controlled by the magnitude and sign of the difference between the tachometer generator outputs. Biasing means in the regulating device operated by a control 47 makes possible a preference of one generator output over the other. By suitable adjustment of this biasing means it is thus possible to maintain either equality or any desired inequality between the speeds of the motors 32 and 36.

One form of regulating device is illustrated in simplified form in Fig. 3, enclosed within the dashed line box 38. The tachometer generators 40 and 42 are connected respectively to potentiometers 46 and 48 in voltage opposing relation. The difference between their two voltages is amplified in a direct-current amplifier 50 whose output signal is applied to the control grid of a rectifier 52 of the gas-filled type which supplies the excitation to the regulating field 33 of the anvil motor 36. Adjustment of the potentiometer 46 (as by the control 47) and of the potentiometer 48 makes possible any desired discrimination in favor of either the anvil or the cutting cylinder.

In place of the electrical system illustrated in Fig. 3 a mechanical system may be employed for regulation of the anvil motor 36, as shown in Fig. 4. Thus the surface speed pickup unit 44, and the cutting cylinder may be linked mechanically with two limbs of a set of differential gears 54 whose third limb may be linked to a rheostat 37 connected in series with the field of the anvil motor. In such case it may be sufficient to employ for the motor 36 one field winding 39 on which the rheostat 37 operates directly. Initial adjustment of the position of the movable contact on the field rheostat 37 here corresponds to adjustment of the potentiometers 46 and 48 of the device of Fig. 3.

A side elevation of a machine embodying the invention is shown in Fig. 2. The upper draw roll 14 is shown supported in ways 15 in which it may be raised or lowered for control of the pressure between the rolls by means of a pneumatic cylinder 9 and linkage 11. The height of the anvil above the cutting cylinder is adjusted by a similar cylinder 23, with protection afforded by a mechanical stop generally indicated at 29.

On setting up the machine, as for example after a change of cutting knives or in response to a change in the material to be cut, the knife blades are set on the cutting cylinder so that their peripheral speed is the same as that of the lower draw roll 12. When the roll 12 and cylinder 26 are of different diameters the linkage between them (30 in Fig. 1) is of course dimensioned accordingly. At the same time the pressure between the draw rolls is adjusted to preclude any tendency of the web to creep with respect to either of the rolls. For this condition a relatively high pressure is required. The separate field of the motor 18 is adjusted so that that motor draws current, as seen on the meter 25, and assists in driving the web through the machine.

The sheet will then be drawn through the rolls inch for inch of their peripheral motion. The regulating device 38, or mechanical equivalent therefore shown in Fig. 4, may be adjusted to give to the anvil a slightly higher peripheral speed than that of the blades on the cylinder 26 so as to preclude the accumulation of slack in the web between the draw rolls and the cutting station. If the shingles as cut are overlength, the progress of the web through the machine can be retarded to the desired (minute) degree by reducing the pressure between the draw rolls and by reducing or making negative if necessary the torque input to the upper draw roll by control of the field excitation on the motor which drives it. With appropriately reduced pressure between the rolls the resulting troque between them will cause the web to creep slightly with respect to both, progressing slightly faster than the upper roll but more slowly than the lower. The plastic covering 16 is of assistance here, especially when the material being cut is thin or of little elasticity. Conversely, if the shingles are short, they may be brought up to the desired length by accelerating the passage of the web through the machine by changing the torque input to the upper draw roll in the opposite direction. Additional fine adjustment is provided in the regulating device 38 which controls the relation between the surface speed of the anvil and effective peripheral speed of the knife, regardless of wear on the anvil.

Similarly, as the knives wear, adjustment to the separately driven draw roll and to the anvil provides compensation in fine steps by means of which the cut pieces of the web may be held to the correct length.

While my invention has been described in terms of a particular embodiment, it will be understood that variations thereof may be made within the scope of the appended claims.

I claim:

1. In a machine for cutting a web of flexible roofing material into shingles of uniform length, two draw rolls, a single rotating knife, a rotating cylindrical anvil supported opposite the knife, a first drive means linked to the rotating knife and to one of the draw rolls, a second drive means linked to the other of the draw rolls, a third drive means linked to the anvil, and means to vary the torque input to the other of the draw rolls.

2. In a machine for cutting a web of flexible material into pieces of uniform length, two draw rolls, a rotating knife, a rotating cylindrical anvil supported opposite the knife, a first drive means linked to the rotating knife and to one of the draw rolls, a second drive means linked to the other of the draw rolls, a direct-current motor linked to the anvil, means to generate a signal representative of the surface speed of the anvil, means to generate a signal representative of the speed of the knife, means to compare said signals and to adjust the excitation of said direct-current motor in accordance with the difference between said signals.

3. In a machine for cutting a web of flexible material into uniform lengths, two draw rolls, a rotating knife, a rotating anvil against which the knife comes to bear once for each revolution of the knife, means to drive one of the draw rolls and the knife at fixed relative angular speeds, separate means to drive the other draw roll, separate means to drive the anvil, and means to compare the surface speed of the anvil with the speed of the knife and to maintain a desired relation therebetween.

4. In a machine for cutting a web of flexible roofing material into uniform shingles, a rotating anvil, a rotating knife adapted to bear against the anvil once for each revolution of the knife, two draw rolls adapted to feed the web to the knife, one of said rolls having a hard surface and the other having a yielding surface, means to adjust the pressure between the draw rolls, separate means to drive the two draw rolls, and means to vary the torque input to the roll having the yielding surface.

5. In a machine for cutting a web of flexible material into uniform lengths, a rotating anvil, a rotating knife adapted to come to bear against the anvil once for each revolution of the knife, two draw rolls adapted to feed the web to the knife, one of the said rolls having a hard surface and the other a soft surface, means to adjust the pressure between the draw rolls, means to drive the knife and hard surfaced roll at fixed relative speeds, separate means to drive the soft surfaced roll, means to vary through positive and negative values the torque input to the soft surfaced roll, means to compare the surface speed of the anvil with the speed of the knife, and means to maintain a desired differential between said speeds.

6. In a machine for cutting a web of flexible roofing material into uniform shingles, a rotating anvil, a rotating knife adapted to come to bear against the anvil once for each revolution of the knife, two draw rolls adapted to feed the web to the knife, one of the said rolls having a hard surface and the other a soft surface, means to adjust the pressure between the draw rolls, means to drive the knife and hard surfaced roll at fixed relative speeds, separate means to drive the soft surfaced roll, and means to vary through positive and negative values the torque input to the soft surfaced roll.

References Cited in the file of this patent

UNITED STATES PATENTS

| | | |
|---|---|---|
| 1,635,166 | Albee | July 12, 1927 |
| 1,991,083 | Dean | Feb. 12, 1935 |
| 2,048,754 | Putnam | July 28, 1936 |
| 2,082,705 | Logan | June 1, 1937 |
| 2,085,981 | Iversen | July 6, 1937 |
| 2,108,767 | Fitzgerald | Feb. 15, 1938 |
| 2,321,057 | Weiss | June 8, 1943 |
| 2,454,021 | Wilson | Nov. 16, 1948 |